United States Patent
Allen et al.

(10) Patent No.: US 10,102,289 B2
(45) Date of Patent: *Oct. 16, 2018

(54) INGESTING FORUM CONTENT

(71) Applicant: International Business Machines Corporation, Armonk, NY (US)

(72) Inventors: Corville O. Allen, Morrisville, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 783 days.

This patent is subject to a terminal disclaimer.

(21) Appl. No.: 14/557,606

(22) Filed: Dec. 2, 2014

(65) Prior Publication Data
US 2016/0154888 A1  Jun. 2, 2016

(51) Int. Cl.
*G06F 17/30* (2006.01)
*H04L 12/58* (2006.01)

(52) U.S. Cl.
CPC .. *G06F 17/30867* (2013.01); *G06F 17/30731* (2013.01); *H04L 51/16* (2013.01); *H04L 51/32* (2013.01)

(58) Field of Classification Search
CPC ......... G06F 17/30864; G06F 17/30867; G06F 17/30654; G06F 17/30731; G06F 17/30675
USPC ................................................ 707/709, 723
See application file for complete search history.

(56) References Cited

U.S. PATENT DOCUMENTS

| | | |
|---|---|---|
| 7,640,164 B2 | 12/2009 | Sasaki et al. |
| 8,185,448 B1 | 5/2012 | Myslinksi |
| 8,224,816 B2 | 7/2012 | O'Malley |
| 8,275,306 B2 | 9/2012 | Attali |
| 8,346,701 B2 | 1/2013 | Wang et al. |
| 8,447,607 B2 | 5/2013 | Weider et al. |
| 8,473,499 B2 | 6/2013 | Song et al. |

(Continued)

FOREIGN PATENT DOCUMENTS

| | | |
|---|---|---|
| JP | 2012-93972 | 5/2012 |
| WO | 2007038292 | 4/2007 |
| WO | 2009052277 | 4/2009 |

OTHER PUBLICATIONS

Hao et al., "Finding similar questions in collaborative question answering archives: toward bootstrapping-based equivalent pattern learning," Springer Science+Business Media, LLC, Feb. 2012, 22 pages.

(Continued)

*Primary Examiner* — Jean M Corrielus
(74) *Attorney, Agent, or Firm* — VanLeeuwen & VanLeeuwen; Diana R. Gerhardt

(57) ABSTRACT

An approach is provided to analyze posts included threads of an online forum. The analyzing identifies a main topic related to a parent post of the thread. Child posts of the thread are selected with the parent post being a parent to each of the child posts. Child topics are identified for each of the child posts. A relevance of each of the child posts is determined by comparing the identified main topic to each of the identified child topics. Child posts are selected based on the relevance of the child posts. Parent post data is ingested into a corpus utilized by a question answering (QA) system. Data from the selected child posts is also ingested into the corpus.

7 Claims, 14 Drawing Sheets

(56) References Cited

U.S. PATENT DOCUMENTS

| | | |
|---|---|---|
| 8,543,565 B2 | 9/2013 | Feng |
| 8,560,567 B2 | 10/2013 | Azzam et al. |
| 9,299,114 B2* | 3/2016 | Hind ................. G06Q 50/01 |
| 9,471,874 B2* | 10/2016 | Byron ................. G06N 5/04 |
| 9,519,688 B2* | 12/2016 | Jamrog ............ G06F 17/30675 |
| 9,542,496 B2* | 1/2017 | Dettman .......... G06F 17/30867 |
| 9,652,528 B2* | 5/2017 | Allen ................ G06F 17/3053 |
| 9,721,005 B2* | 8/2017 | Byron .............. G06F 17/30696 |
| 9,734,239 B2* | 8/2017 | Allen ............... G06F 17/30684 |
| 2004/0254917 A1 | 12/2004 | Brill et al. |
| 2005/0266387 A1 | 12/2005 | Rossides |
| 2006/0078862 A1 | 4/2006 | Goto et al. |
| 2008/0096533 A1 | 4/2008 | Manfredi et al. |
| 2008/0205774 A1 | 8/2008 | Brinker et al. |
| 2009/0150388 A1 | 6/2009 | Roseman et al. |
| 2009/0162824 A1 | 6/2009 | Heck |
| 2010/0119053 A1 | 5/2010 | Goeldi |
| 2011/0040759 A1 | 2/2011 | Rappoport et al. |
| 2011/0119047 A1 | 5/2011 | Ylonen |
| 2011/0295593 A1* | 12/2011 | Raghuveer .......... G06F 17/2785 704/9 |
| 2011/0295594 A1 | 12/2011 | Cai et al. |
| 2011/0301941 A1 | 12/2011 | De Vocht |
| 2012/0072217 A1 | 3/2012 | Bangalore et al. |
| 2012/0078613 A1 | 3/2012 | Kandekar et al. |
| 2012/0078889 A1* | 3/2012 | Chu-Carroll ...... G06F 17/30654 707/723 |
| 2012/0116982 A1 | 5/2012 | Yoshida et al. |
| 2012/0185544 A1 | 7/2012 | Chang et al. |
| 2012/0221638 A1 | 8/2012 | Edamadaka |
| 2012/0278253 A1* | 11/2012 | Gahlot ............... G06Q 30/0201 705/347 |
| 2013/0013706 A1* | 1/2013 | Gupta .................... G06Q 10/10 709/206 |
| 2013/0103667 A1* | 4/2013 | Minh ................ G06F 17/30864 707/709 |
| 2013/0224713 A1 | 8/2013 | Ajmera et al. |
| 2013/0238601 A1 | 9/2013 | Kanemoto et al. |
| 2013/0262501 A1 | 10/2013 | Kuchmann-Beauger et al. |
| 2013/0282532 A1 | 10/2013 | Shihiadh et al. |
| 2013/0297625 A1 | 11/2013 | Biemer et al. |
| 2013/0317808 A1 | 11/2013 | Kruel et al. |
| 2014/0012863 A1 | 1/2014 | Sundaresan et al. |
| 2014/0019443 A1* | 1/2014 | Golshan ............ G06F 17/30867 707/723 |
| 2014/0039877 A1 | 2/2014 | Guenigault et al. |
| 2014/0040370 A1* | 2/2014 | Buhr ..................... H04L 67/306 709/204 |
| 2014/0067370 A1* | 3/2014 | Brun ..................... G06F 17/271 704/9 |
| 2014/0074728 A1* | 3/2014 | Margulies .............. G06Q 30/01 705/304 |
| 2014/0129492 A1 | 5/2014 | Petri et al. |
| 2014/0164398 A1 | 6/2014 | Smith et al. |
| 2014/0278363 A1 | 9/2014 | Allen et al. |
| 2015/0032675 A1 | 1/2015 | Huehn et al. |
| 2015/0074095 A1 | 3/2015 | Enders et al. |
| 2015/0088894 A1 | 3/2015 | Czarlinska et al. |
| 2015/0254230 A1 | 9/2015 | Papadopoullos et al. |
| 2016/0050221 A1 | 2/2016 | Myslinski |
| 2016/0140619 A1* | 5/2016 | Soni ................... G06Q 30/0269 705/14.66 |

OTHER PUBLICATIONS

Office Action for U.S. Appl. No. 14/570,305, U.S. Patent and Trademark Office, dated Mar. 9, 2016, 18 pages.

Office Action for U.S. Appl. No. 15/054,936, U.S. Patent and Trademark Office, dated Nov. 8, 2016, 40 pages.

Allen et al., "Ingesting Forum Content," U.S. Appl. No. 14/726,467, filed May 30, 2015, 53 pages.

Allen et al., "Persona-Based Conversation," U.S. Appl. No. 14/726,468, filed May 30, 2015, 54 pages.

Allen et al., "Inter Thread Anaphora Resolution," U.S. Appl. No. 15/054,936, filed Feb. 26, 2016, 54 pages.

"List of IBM Patents or Patent Applications Treated as Related," Letter from Leslie A. Van Leeuwen, Feb. 26, 2016, 2 pages.

Allen et al., "Determining the Correct Answer in a Forum Thread," U.S. Appl. No. 14/567,224, filed Dec. 11, 2014, 73 pages.

Allen et al., "Annotating Posts in a Forum Thread with Improved Data," U.S. Appl. No. 14/567,258, filed Dec. 11, 2014, 74 pages.

Allen et al., "Training a Question/Answer System Using Answer Keys Based on Forum Content," U.S. Appl. No. 14/570,305, filed Dec. 15, 2014, 58 pages.

Office Action for U.S. Appl. No. 14/557,637, U.S. Patent and Trademark Office, dated Jul. 29, 2016, 30 pages.

Office Action for U.S. Appl. No. 14/567,224, U.S. Patent and Trademark Office, dated Sep. 19, 2016, 32 pages.

Office Action for U.S. Appl. No. 14/567,258, U.S. Patent and Trademark Office, dated Aug. 12, 2016, 35 pages.

Ding et al., "Resolving Object and Attribute Coreference in Opinion Mining," Proceedings of the 23rd International Conference on Computational Linguistics (Coling 2010), Aug. 2010, Beijing, China, 9 pages.

Kim et al., "Best-Answer Selection Criteria in a Social Q&A Site from the User-Oriented Relevance Perspective," Proceedings of the 70th Annual Meeting of the American Society for Information Science and Technology (Milwaukee), Aug. 30, 2008, 11 pages.

Pera et al., "A Community Question-Answering Refinement System," HT'11, The 22nd ACM Hypertext Conference, Posters and Demos, Jun. 6-9, 2011, Eindhoven, The Netherlands, 3 pages.

Gottipati et al., "Finding Thoughtful Comments from Social Media", Proceedings of COLING 2012: Technical Papers, pp. 995-1010, Mumbai, Dec. 2012.

Agichtein, Eugene et al., "Finding High-quality content in social media," Proceedings of the International Conference on Web Search and Web Data Mining, WSDM'08, Feb. 11-12, 2008, Palo Alto, California, USA, 11 pages.

Allen et al., "Persona-Based Conversation," U.S. Appl. No. 14/557,618, filed Dec. 2, 2014, 62 pages.

Allen et al., "Inter Thread Anaphora Resolution," U.S. Appl. No. 14/557,637, filed Dec. 2, 2014, 60 pages.

\* cited by examiner

INGESTING FORUM CONTENT

BACKGROUND

An network-based forum, or message board, is an online discussion site where users hold conversations in the form of posted messages. Forums have a specific terminology associated with them. For example, a single conversation is referred to as a "thread," or topic. A discussion forum is hierarchical, or tree-like, in structure. Additionally, a forum can contain a number of sub-forums, each of which may have several topics. Within a forum's overall topic, each new discussion started is referred to as a thread, and can be replied to by as many people as so wish. Depending on the forum's settings, users can be anonymous or have to register with the forum and then subsequently log in in order to post messages.

Question answering (QA) systems do not ingest forum content in a way that takes advantage of the conversational nature of forums. Traditional approaches ingest the entire forum thread as a single message body, or maintain the parent-child structure of conversational nodes without tying posts to one another. Current ingestion processes cannot detect when a forum thread is straying off-topic or diverging to a useful conclusion. Forum content contains subtle information in a conversational nature.

BRIEF SUMMARY

According to one embodiment of the present disclosure, an approach is provided to analyze posts included threads of an online forum. The analyzing identifies a main topic related to a parent post of the thread. Child posts of the thread are selected with the parent post being a parent to each of the child posts. Child topics are identified for each of the child posts. A relevance of each of the child posts is determined by comparing the identified main topic to each of the identified child topics. Child posts are selected based on the relevance of the child posts. Parent post data is ingested into a corpus utilized by a question answering (QA) system. Data from the selected child posts is also ingested into the corpus.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
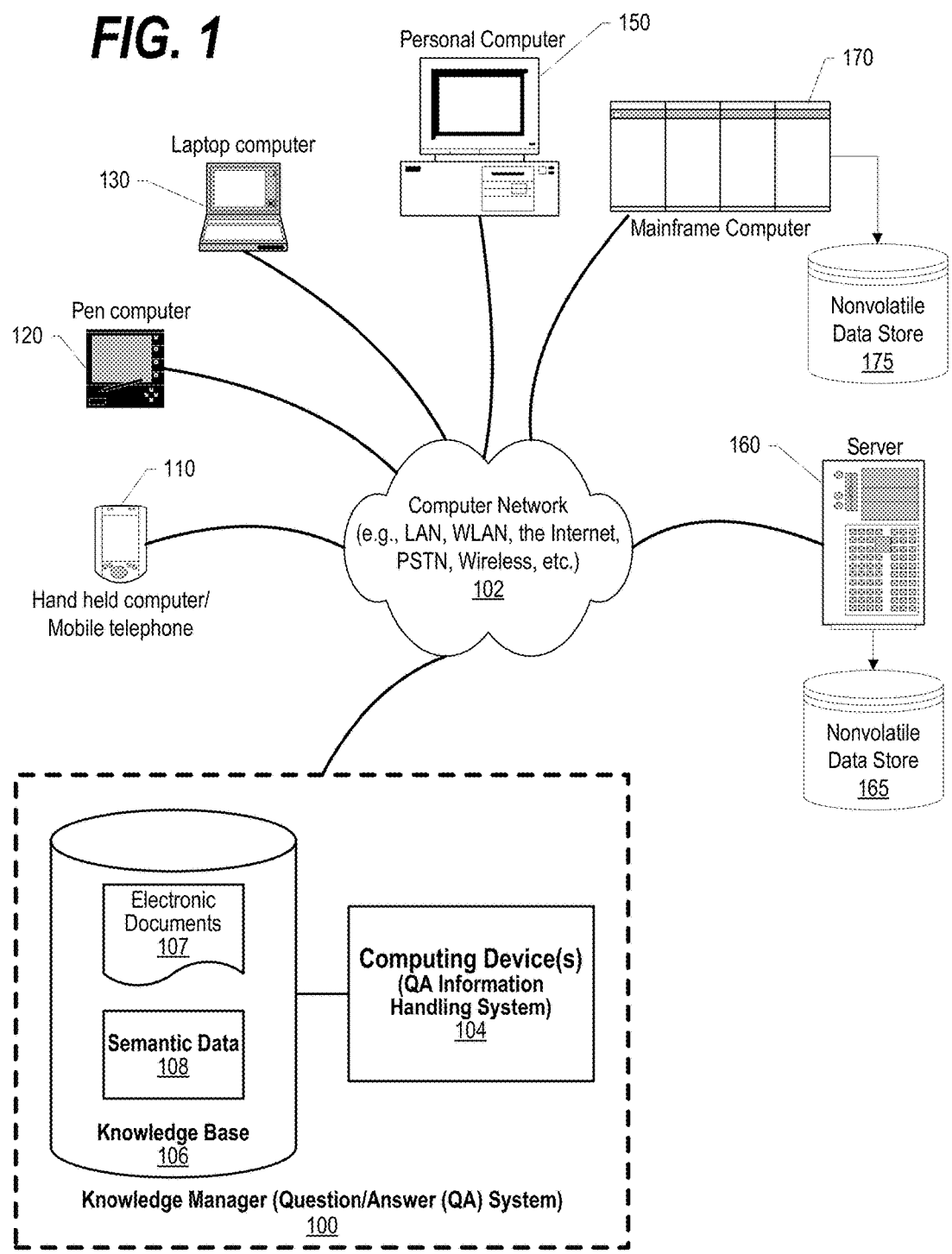
FIG. 1 depicts a schematic diagram of one illustrative embodiment of a question/answer creation (QA) system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
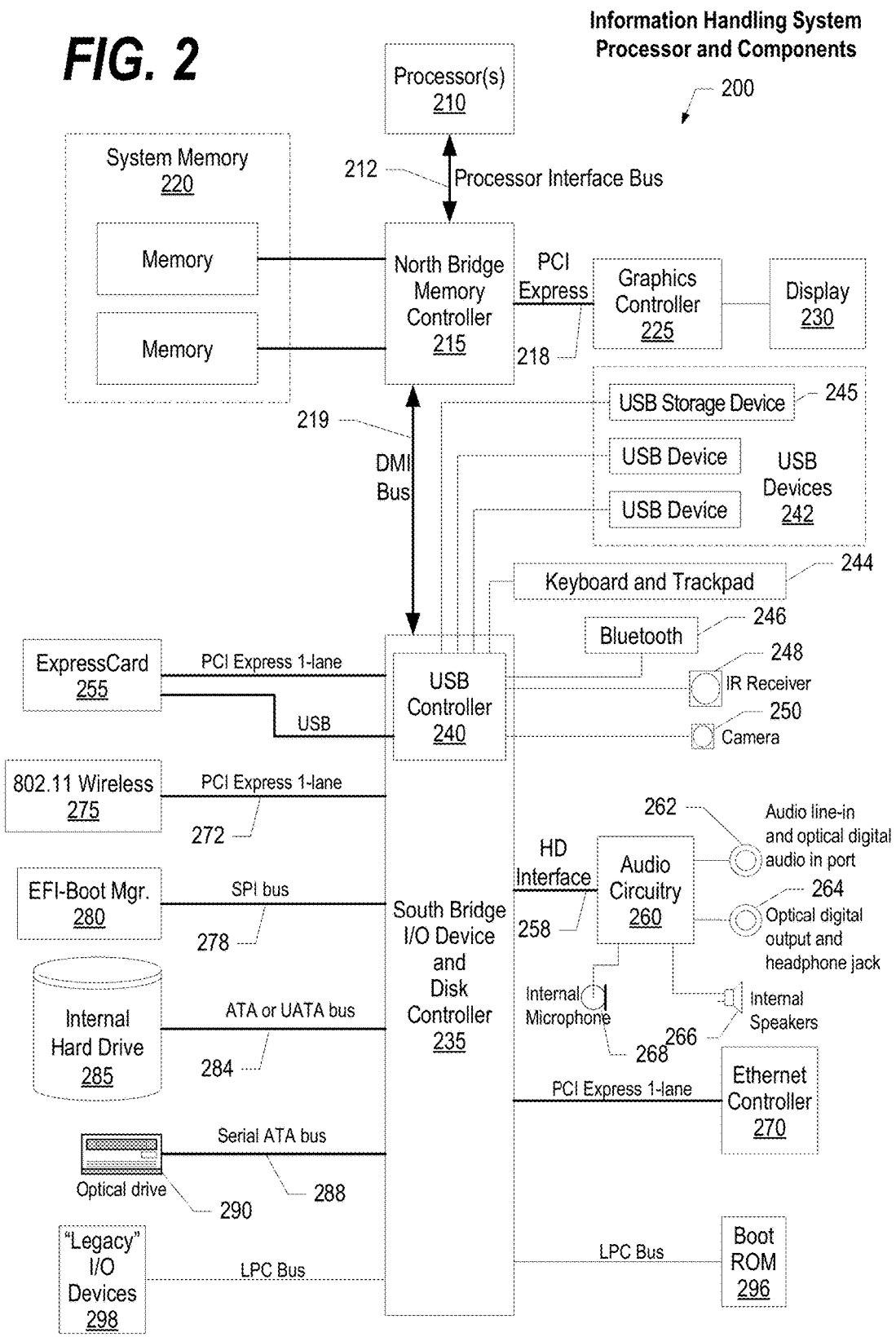
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-14 depict an approach that ingest a forum, thread or comments and maintains the forum concepts within the ingested corpora associating a relevance to the set of responses to the main topic. In addition, the sentiment level of the responses in accordance to it's parent and the main topic are maintained. The conversational flow can take on a leader or follower persona when responding. This approach provides that the ingested corpora maintains the conversational state of the posts and their relevance across each other. The system utilizes corpora and it's specific features in other ways such as to teach the question answering (QA) system conversational tactics.

The approach ingests thread data to the corpora. When a post references and quotes previous thread content, the relationship is noted to the overall topic. The approach identifies inline Inter-Thread-Anaphora by resolving inline statements and their parents including looking at the LAT and focus of the inline statements for sub-responses within a single post. The sub-responses are related to the in-line quotations and their respective posts, providing a sub-sentiment and sub-relevance which then influences the overall relevance and parent relevance scores of the current response. The "inter-thread anaphora resolution" utilized is similar to intra-paragraph anaphora resolution, because forum threads have a common focus (the forum topic). Furthermore, the approach derives additional context on the anaphora found in child posts from referential terms found in parent posts.

Figure 3:
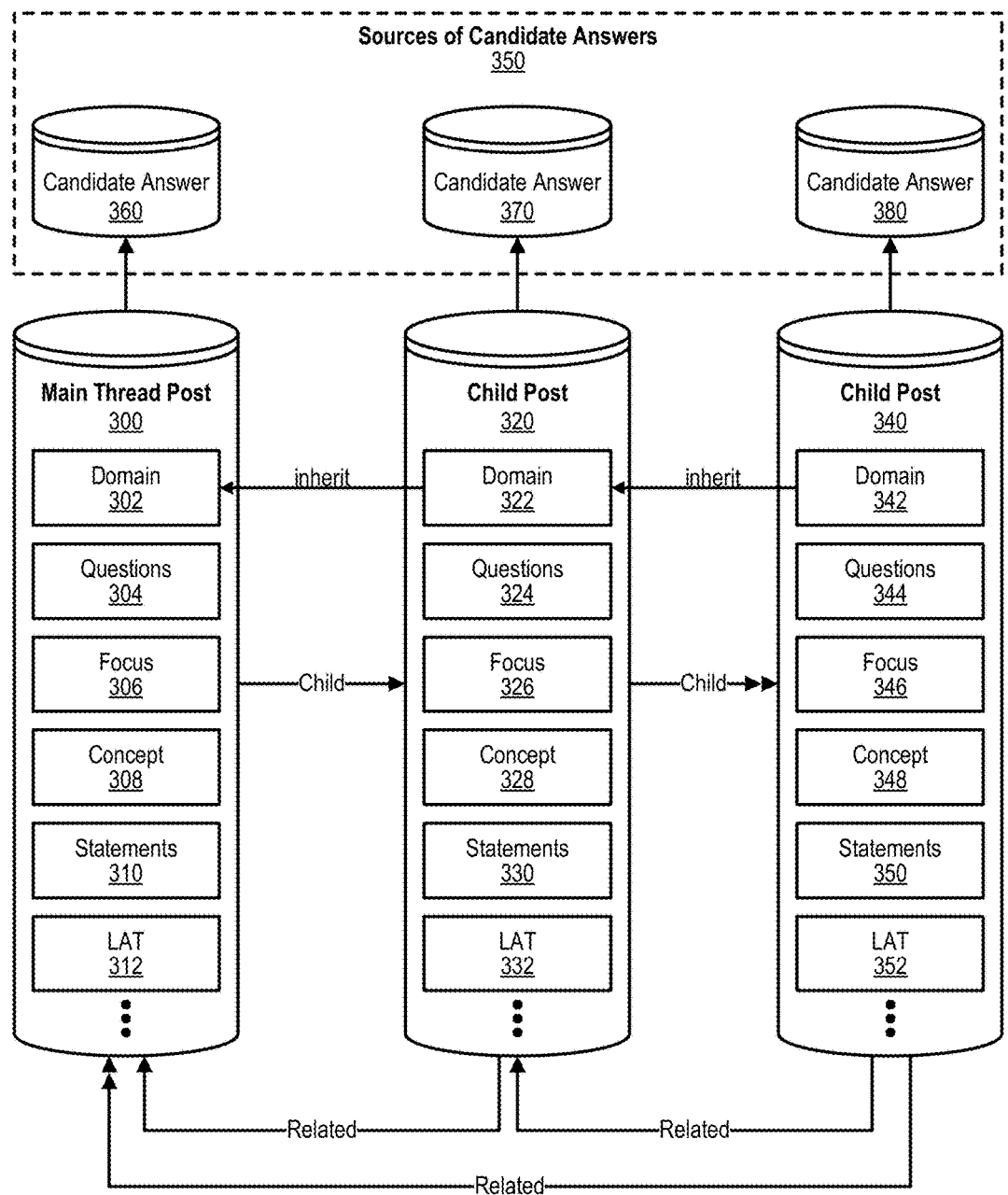
FIG. 3 is an exemplary diagram depicting the relationship between posts in a forum with candidate answers derived from the various posts.

FIG. 3 is an exemplary diagram depicting the relationship between posts in a forum with candidate answers derived from the various posts. Posts included in a forum include main thread post 300 and child posts (320 and 340). Posts are interrelated both through the common main thread post (300) but also outside the main post where some posts, while being a child post of the main post, also serve as "parent" posts to other child posts. FIG. 3 depicts an instance or embodiment of a threaded discussion, where there is a main post and child posts to a main post. In this embodiment, any posts can be a parent post of subsequent child posts, where text, images and information can be placed. There is an implicit relationship in a threaded discussion between the parent post and all child posts, and even grandchildren posts, etc. The threaded discussion can take place online, off-line, in direct communication in a chat engine, or in comments to messages in text messages. These threaded discussions can be built based on phone conversations, such as text messaging, where there is a back and forth discussion between multiple parties. Comments made to topics on the web can be treated as threaded discussions with a main post or topic and several child posts.

In the example shown, child post 320 is a child of main post 300 and child post 340 is a child of post 320, so that post 320 is a child to main post 300 and a parent post to child post 340. Relationships are established between child posts and their parent posts.

During analysis of the online forum, various types of data, or attributes, are gathered or deduced from the various posts. Each of the posts depicted (posts 300, 320, and 340) are each shown as having each of the attributes. These attributes include the domain to which the post belongs (domain 302 for main post 300, domain 322 for child post 322, and domain 342 for child post 342), questions included in the post (questions 304 for main post 300, questions 324 for child post 320, and questions 344 for child post 340), the focus of the post (focus 306 for main post 300, focus 326 for child post 320, and focus 346 for child post 340), the concept of the post (concept 308 for main post 300, concept 328 for child post 320, and concept 348 for child post 340), the statements made in the post (statements 310 for main post 300, statements 330 for child post 320, and statements 350 for child post 340), and the Lexical Answer Types ("LATs" which are the type of answer that will be required for the question, such as a person, place, film name, etc.). The LATs for the posts shown include LATs 312 for main post 300, LATs 332 for child post 320, and LATs 352 for child post 340.

Sources of candidate answers 350 include any posts in the forum based on the QA analysis performed by the QA system. The QA system utilizes resolved anaphors when analyzing child posts that refer to items that were included in parent posts. In the example, sources of candidate answers 350 include a candidate answer derived from main post 300 (candidate answer 360), a candidate answer derived from child post 320 (candidate answer 370), and a candidate answer derived from child post 340 (candidate answer 380).

The following is an example of anaphor resolution between posts. First, a main thread is posted to an online forum with a title of "Product outage next Friday from noon to midnight" with post text as "Hi everyone—the area I work in uses the product a lot—any chance the upgrade outage can be pushed until the weekend?" A child post is received that says "Hi John—our infrastructure support is M-F, so pushing stuff to the weekends is not usually possible. Especially in this case with technicians installing memory, they only work during the week. Keep in mind, you can still develop, just not deliver changes to each other." Here, the word "stuff" is an anaphor that refers to the term "upgrade" in the main post. Another post is received saying "Still down . . . any updates on the timeline?" Here, the words "still down" are an anaphor referring to the term "product outage" in the main post and the word "timeline" is an anaphor referring to the date and time ("Friday from noon to midnight") as the original timeline when the outage was scheduled. As used herein, a "term" in one post, such as a parent post, is any term, phrase, passage, or expression that provides a referential term to which an anaphor in a child post refers.

Figure 4:
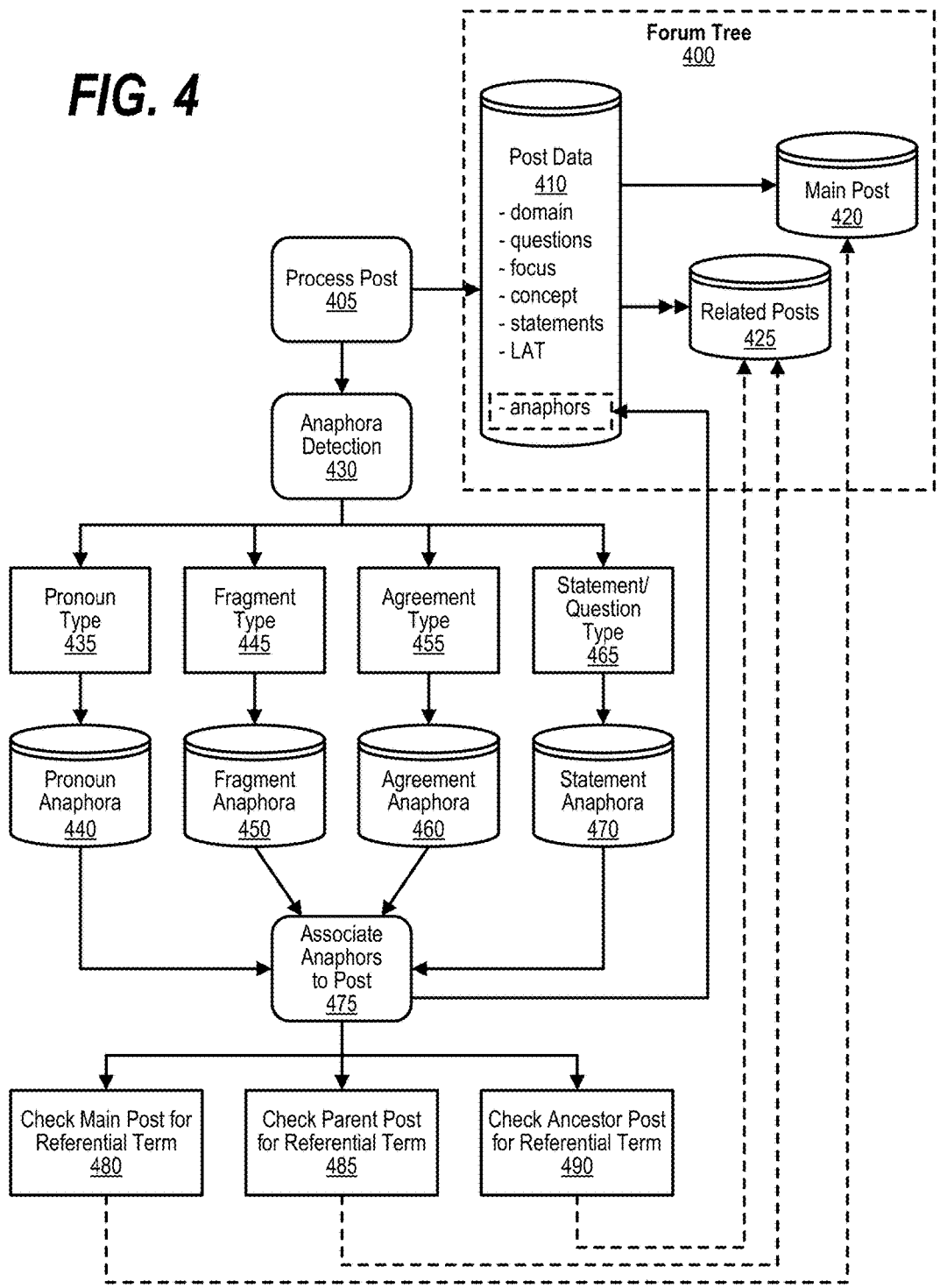
FIG. 4 is an exemplary diagram depicting various processes and data stores used to perform inter-thread anaphora resolution.

FIG. 4 is an exemplary diagram depicting various processes and data stores used to perform inter-thread anaphora resolution. Forum tree 400 is a collection of data pertaining to an online forum that is being analyzed. Post data 410 shows data elements, or attributes, that are gathered or deduced from the various posts including the domain of the post, questions posed by the post, the focus of the post, any concepts included in the post, statements made in the post and the Lexical Answer Type (LAT) of the post. In addition, anaphors that are found and resolved for the post are also stored for the post.

In forum tree 400, post data includes a main post 420 and relationships between posts, signified as related posts 425. Relationships include parent child relationships where one post (a child post) is posted after and references another post (the parent post). Main post 420 serves as a parent post to one or more other (child) posts in the forum tree.

Anaphora detection process 430 detects anaphors in identified child posts and uses referential data found in parent posts to resolve such anaphors. Anaphora detection can be broken down into different types of anaphora detection. These different types of anaphora detection include pronoun type 435 where a pronoun found in a child post refers to a noun found in a parent post. For example, the pronoun "he" found in a child post might refer to a person that was referenced in a parent post. Pronoun anaphors are stored in data store 440.

Another type of anaphora detection is fragment type 445 where a subject fragment that is found in a child post refers to a subject found in a parent post. Using the example introduced above for a software product outage, a fragment (anaphor) found in a child post of "still down" was detected and found to refer back to the product outage term that was referenced in the main post. Fragment anaphors are stored in data store 450.

Another type of anaphora detection is agreement type 455 where a statement of agreement that is found in a child post refers to an opinion or answer that was found in a parent post. For example, in a forum discussing a movie, a main post could opine that a particular movie was "fantastic." A child post could have a statement of agreement, such as "me too," or "+1," or "correct you are!" with such agreements referring back to the opinion that the movie was fantastic. Disagreements are also detected as agreement type anaphors where, instead of agreeing, the child post includes a statement of disagreement, such as "no way," "I don't think so," or "are you crazy?" with such agreements referring back to the opinion that the movie was fantastic. Agreement type anaphors are stored in data store 460.

Another type of anaphora detection is statement/question type 455 where a statement that is found in a child post refers to a question that was found in a parent post. For example, in a forum discussing the movie, a main post could pose a question of "who is the main actor in the movie?" A child post could provide an answer, such as "John Doe is the leading man in the film" with such answer referring back to the question posed in the parent post. Statement/question type anaphors are stored in data store 470.

Process 475 associates the anaphors found in the child posts to their respective terms found in their parent posts. The resolved anaphor (e.g., the pronoun "he" resolved to a particular person's name, etc.) is stored in the post's data in data store 410. To associate anaphors to parent posts, the parent posts with the relevant terms that is referenced by the anaphor found in the child post needs to be detected. This detection is performed by checking for referential terms in different types of posts. At 480, the main post in the thread or forum is checked for referential terms. At 485, the parent post of the child post is checked for referential terms. The referential terms might not be in the main or parent post, but might be in an intervening "ancestor" post between the main post and the parent post. At 490, these ancestor posts are checked for referential terms. When referential terms are found in a parent post (either the main post, the immediate parent post, or an ancestor post), the relationship is noted in forum tree 400.

Figure 5:
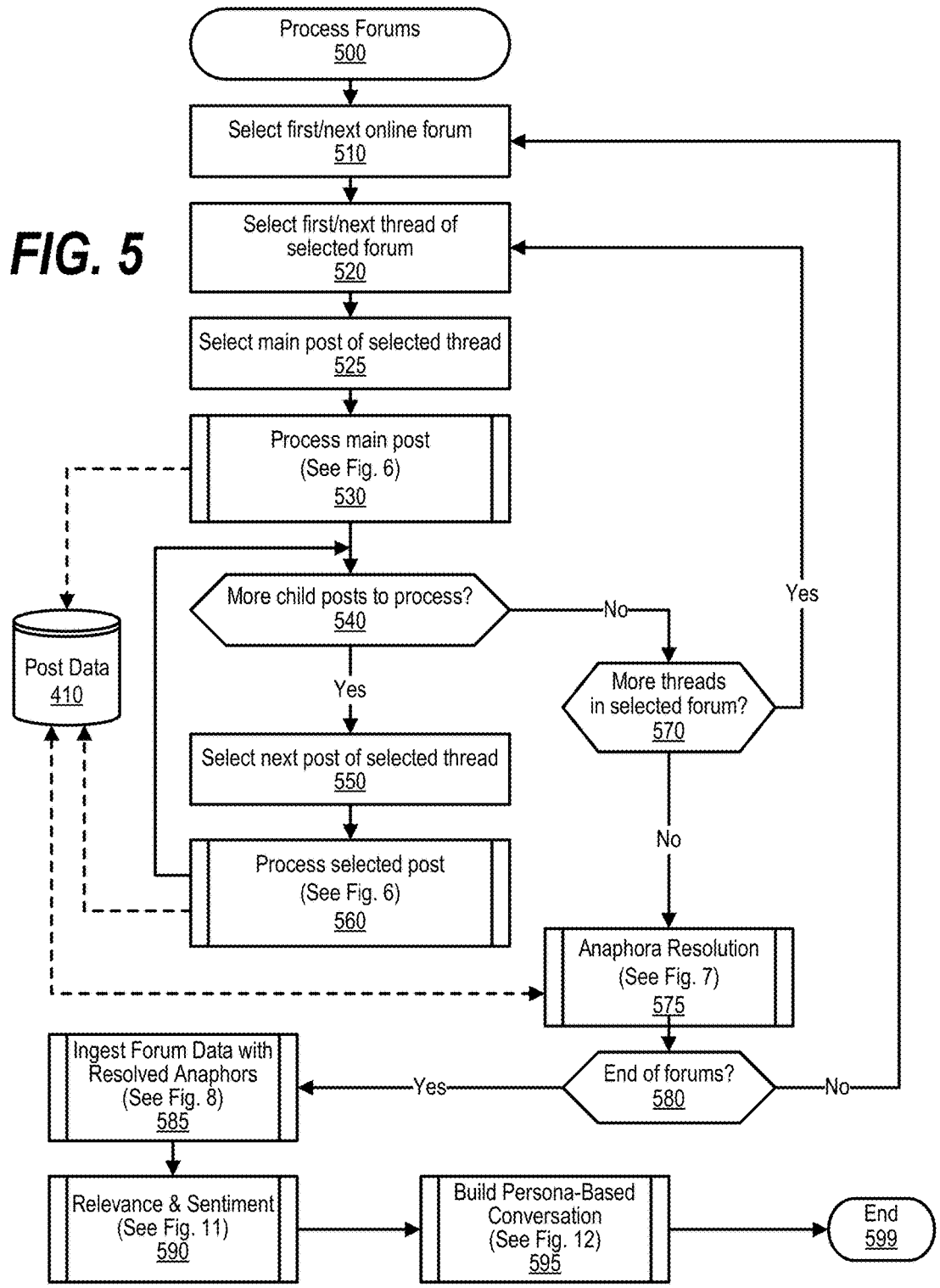
FIG. 5 is an exemplary high level flowchart that performs steps to process a forum for ingestion to a question answering (QA) system.

FIG. 5 is an exemplary high level flowchart that performs steps to process a forum for ingestion to a question answering (QA) system. FIG. 5 processing commences at 500 and shows the steps taken by a process that performs a routine that processes online forums. At step 510, the process selects the first online forum that is being processed. At step 520, the process selects the first thread from the selected forum. At step 525, the process selects the main post of selected thread.

Figure 6:
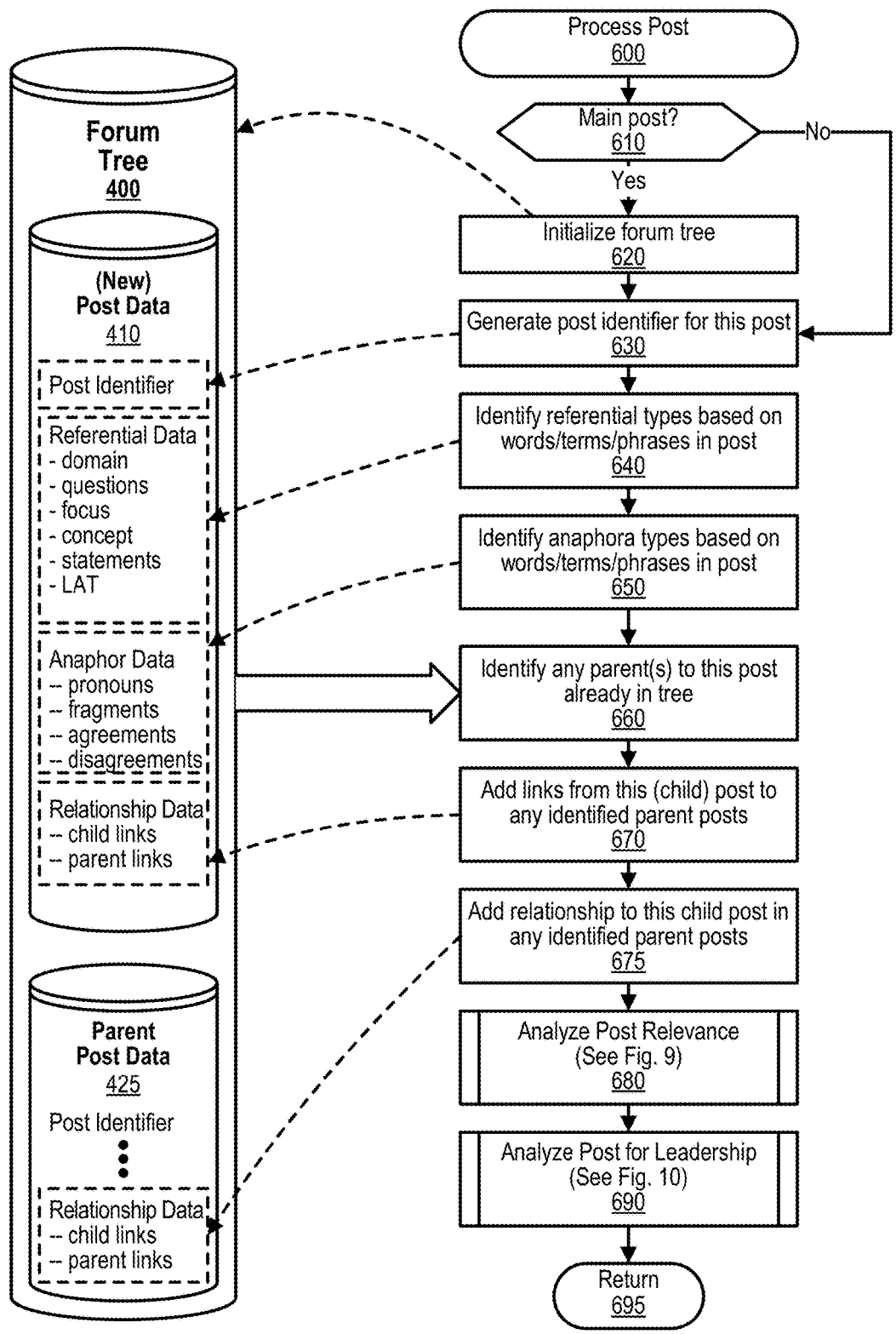
FIG. 6 is an exemplary flowchart that processes a selected post from a forum.

At predefined process 530, the main post is processed (see FIG. 6 and corresponding text for processing details). The data gathered from processing the main post is stored as post data in data store 410. The process determines as to whether there are child posts to process in the selected thread (decision 540). If there are more child posts to process, then decision 540 branches to the 'yes' branch to process additional child posts. At step 550, the process selects the next post from selected thread. At predefined process 560, the process performs the process selected post routine (see FIG. 6 and corresponding text for processing details). The data gathered from the child post is stored as post data in data store 410. Processing then loops back to decision 540.

Once all of the child posts are processed, decision 540 branches to the 'no' branch whereupon the process determines as to whether there are more threads in the selected forum to process (decision 570). If there are more threads in the selected forum to process, then decision 570 branches to the 'yes' branch which loops back to step 520 to select the next thread from the selected forum. This looping continues until there are no more threads in the selected forum to process, at which point decision 570 branches to the 'no' branch for anaphora resolution.

Figure 7:
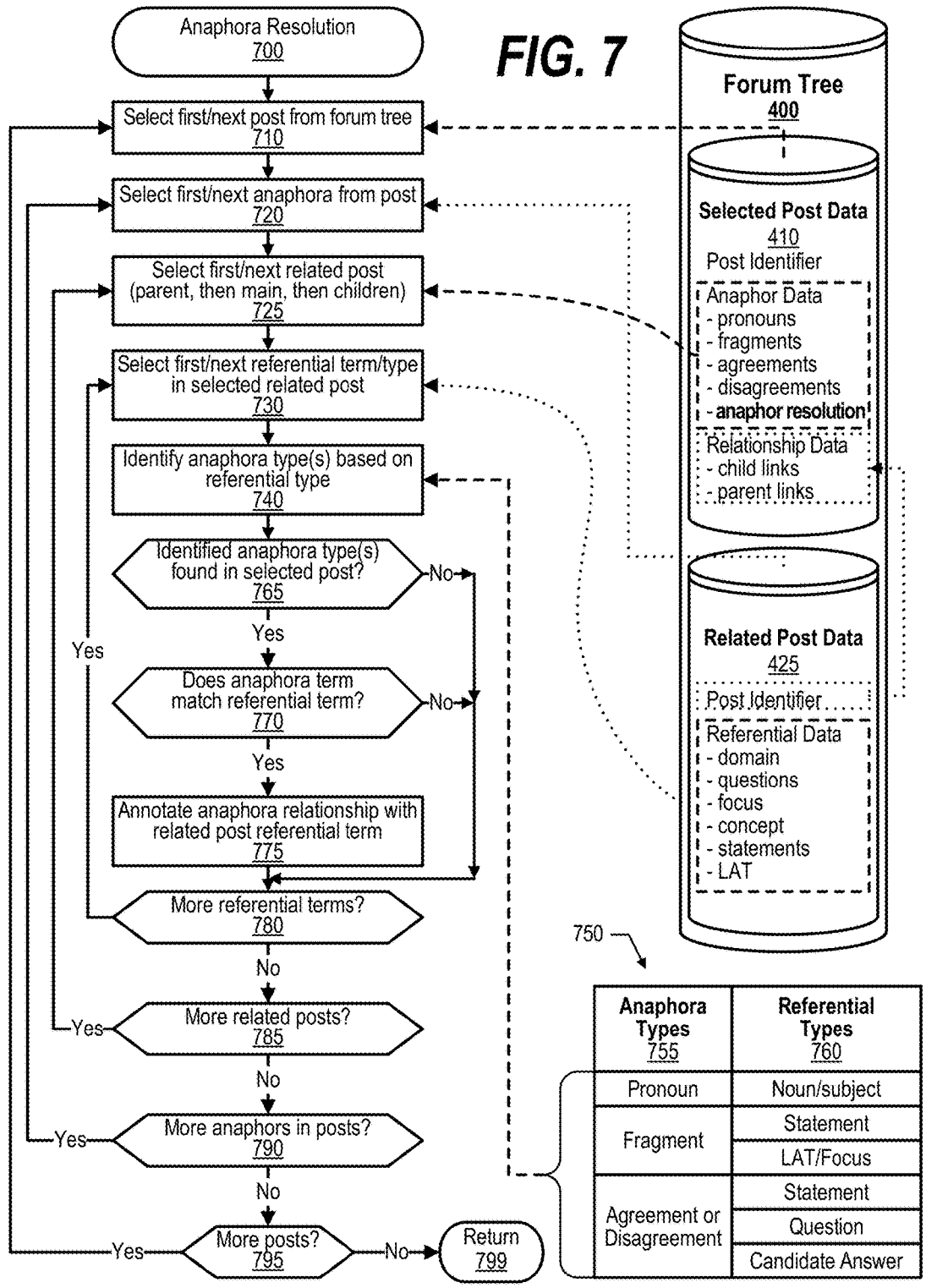
FIG. 7 is an exemplary flowchart depicting anaphora resolution of terms found in posts of a forum.

At predefined process 575, the process performs the anaphora resolution routine (see FIG. 7 and corresponding text for processing details). The anaphora resolution routine detects anaphors found in posts from post data store 410, resolves the anaphors with terms found in referential data from other posts stored in post data store 410, and resolves the anaphor by storing the identified terms referenced by the anaphors in the post data 410.

The process determines as to whether the end of forums being processed has been reached (decision 580). If the end of forums being processed has not yet been reached, then decision 580 branches to the 'no' branch which loops back to step 510 to select the next forum and process the posts in the forum as described above. This looping continues until the end of the forums being processed has been reached, at which point decision 580 branches to the 'yes' branch for further processing.

Figure 8:
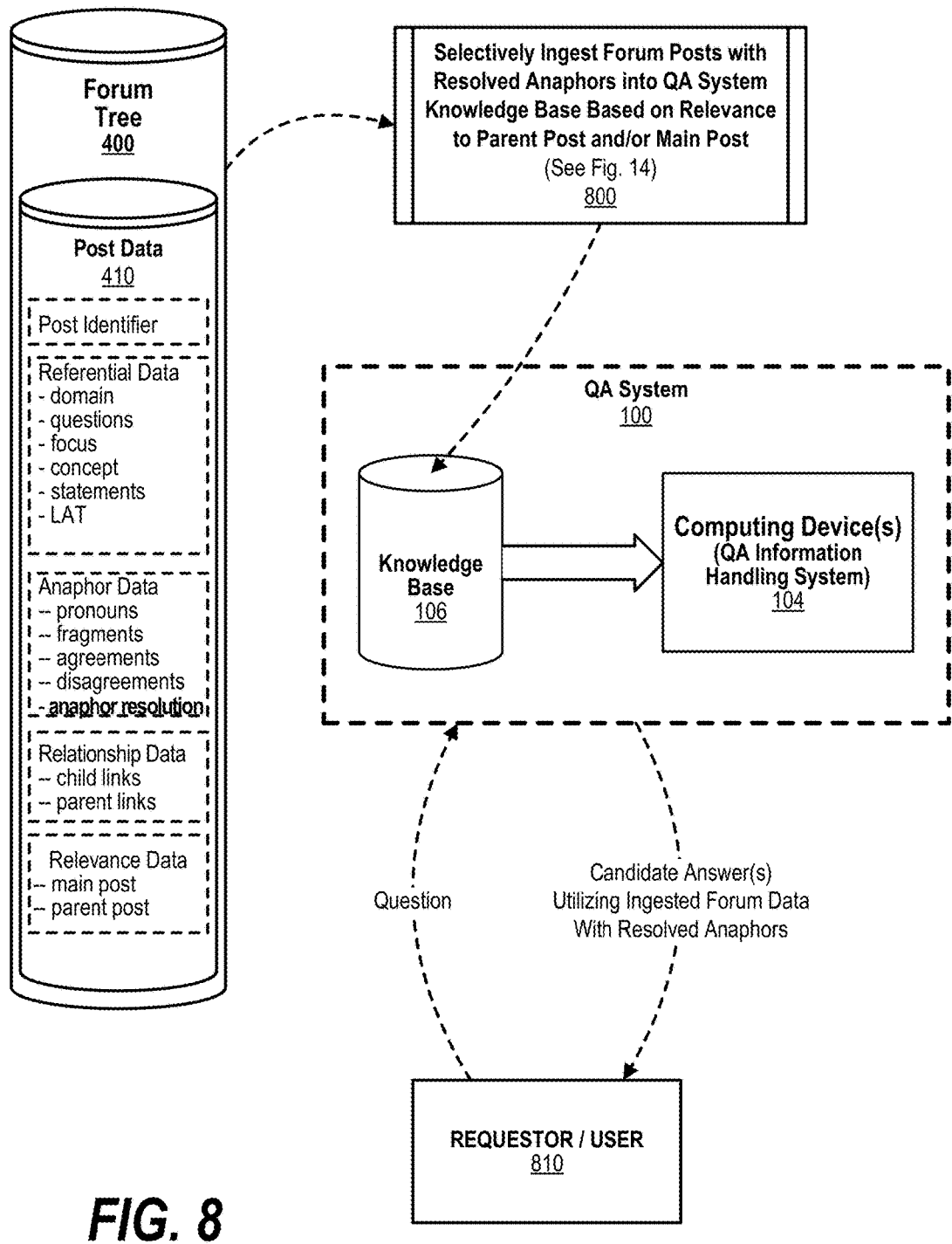
FIG. 8 is an exemplary flowchart depicting steps performed by the process that ingests forum data with resolved anaphors to a question answering (QA) system.

At predefined process 585, the process performs the Ingest Forum Data with Resolved Anaphors routine (see FIG. 8 and corresponding text for processing details). At predefined process 590, the process performs the Relevance & Sentiment routine (see FIG. 11 and corresponding text for processing details). At predefined process 595, the process performs the Build Persona-Based Conversation routine (see FIG. 12 and corresponding text for processing details). FIG. 5 processing thereafter ends at 599.

FIG. 6 is an exemplary flowchart that processes a selected post from a forum. FIG. 6 processing commences at 600 and shows the steps that perform a routine that processes data found in a post. The process determines as to whether the post being processed is the main post of the forum thread (decision 610). If the post being processed is the main post of the forum thread, then decision 610 branches to the 'yes' branch whereupon, at step 620, the process initializes forum tree 400 used to store the post data associated with this forum thread. On the other hand, if the post being processed is not the main post of the forum thread, then decision 610 branches to the 'no' branch bypassing step 620.

At step 630, the process generates a unique post identifier for this post and adds a record used to store this post data in forum tree 400 with new post data 410. At step 640, the process identifies referential types based on words, terms, and phrases found in the post that is being processed. Referential data can include the domain of the post, questions posed by the post, the focus of the post, any concepts included in the post, statements made in the post and the Lexical Answer Type (LAT) of the post.

At step 650, the process identifies anaphora types based on the words, terms, and phrases found in post that is being processed. Types of anaphors include pronoun type anaphors, fragment type anaphors, agreement type anaphors, and statement type anaphors.

At step 660, the process identifies any parent(s) to this post that are already included in forum tree 400. Parent posts include the main post to the thread, the direct parent post of the thread, and any intervening parent (ancestor) posts between the main post and the direct parent post. At step 670, the process adds links from this (child) post to any identified parent posts that were found in step 660. At step 675, the relationships between this post and parent posts are added to post data included in data store 410. Links are added to this post as links to the parent posts, and in the respective parent post data (425) as links to this child post with data store 425 being a subset of data store 410 and shown as a separate data store for illustrative purposes.

Figure 9:
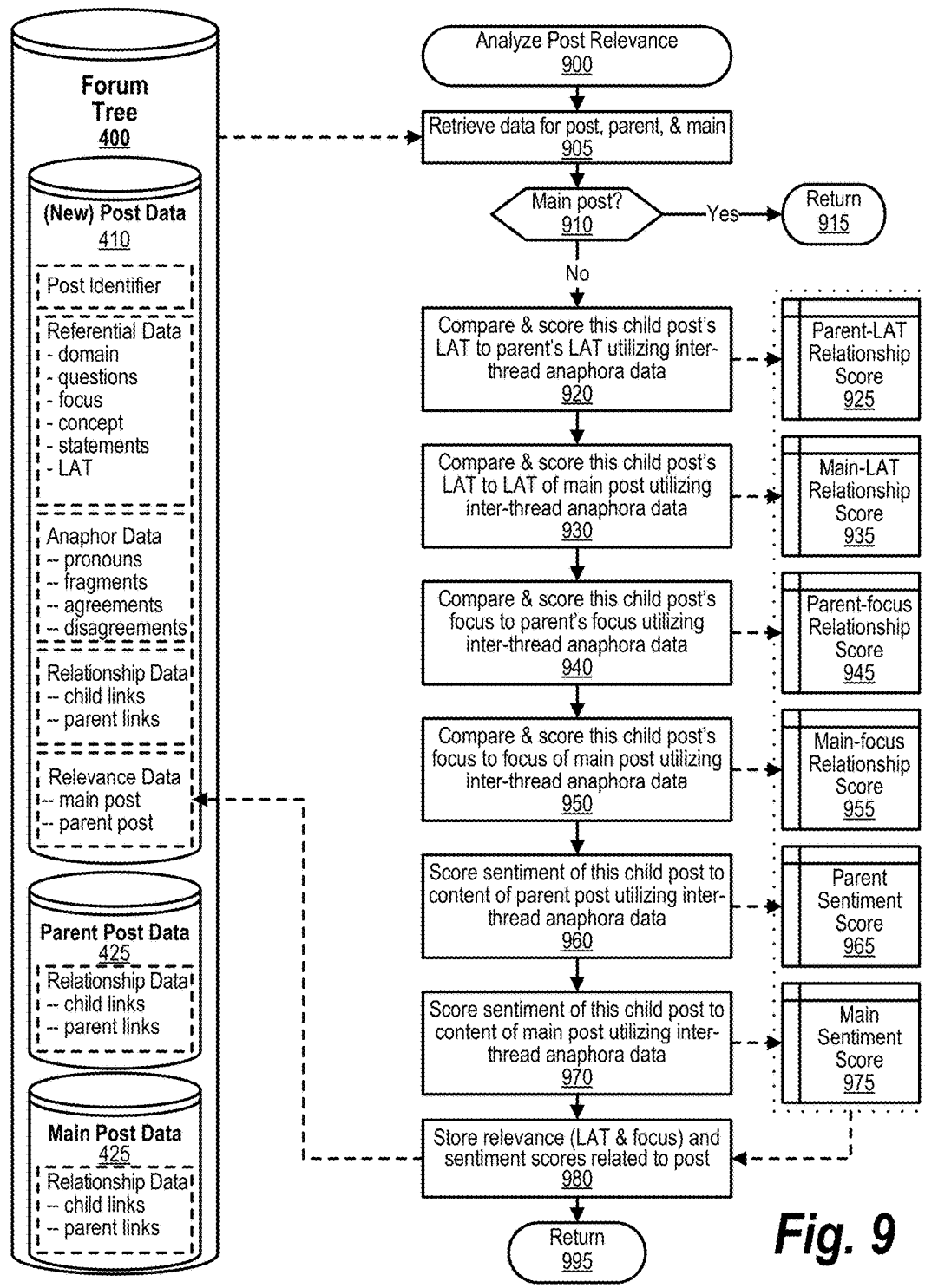
FIG. 9 is an exemplary flowchart depicting steps that analyze a post relevance.

At predefined process 680, the process performs the Analyze Post Relevance routine (see FIG. 9 and corresponding text for processing details). At predefined process 690, the process performs the Analyze Post for Leadership routine (see FIG. 10 and corresponding text for processing details). FIG. 6 processing thereafter returns to the calling routine (see FIG. 5) at 695.

FIG. 7 is an exemplary flowchart depicting anaphora resolution of terms found in posts of a forum. FIG. 7 processing commences at 700 and shows the steps taken by a process that performs a routine that resolves anaphors found in a child post. At step 710, the process selects the first post from forum tree 400. At step 720, the process selects the first anaphor from the selected post (if an anaphor exists in the post). At step 725, the process selects the first related post (immediate parent post, then main post, then ancestor posts) from forum tree 400. At step 730, the process selects the first referential term/type from the selected related post.

Table 750 depicts the relationship between anaphora types (755) and their respective referential types (760). Pronoun type anaphors are resolved with referential types found in a parent post of a noun or subject. Fragment type anaphors are resolved with referential types found in a parent post of a statement, a Lexical Answer Type (LAT), or focus. Agreement type anaphors are resolved with referential types found in a parent post of a statement or opinion, a question, or a candidate answer. At step 740, the process identifies anaphora type(s) for the selected anaphor based on the referential type as shown in table 750.

The process determines as to whether the identified anaphora type(s) were found in the selected child post (decision 765). If the identified anaphora type(s) were found in the selected child post, then decision 765 branches to the 'yes' branch for continued processing. On the other hand, if the identified anaphora type(s) were not found in the selected child post, then decision 765 branches to the 'no' branch bypassing decision 770 and step 775. The process determines as to whether the anaphora term found in the child post matches the referential term found in the parent post (decision 770). If the anaphora term found in the child post matches the referential term found in the parent post, then decision 770 branches to the 'yes' branch, whereupon, at step 775, the process annotates the anaphora relationship with related post referential term. In addition, at step 775, the anaphor found in the child post is resolved using the referential term found in the parent post. The annotated anaphora relationship data and the resolved anaphor data is stored in post data 410. On the other hand, if the anaphora term found in the child post does not match the referential term found in the parent post, then decision 770 branches to the 'no' branch bypassing step 775.

The process determines as to whether there are more referential terms that need to be processed (decision 780). If there are more referential terms that need to be processed, then decision 780 branches to the 'yes' branch which loops back to step 730 to select and process the next referential term. This looping continues until all referential terms have been processed, at which point decision 780 branches to the 'no' branch.

The process determines as to whether there are more related posts that need to be processed (decision 785). If there are more related posts that need to be processed, then decision 785 branches to the 'yes' branch which loops back to step 725 to select and process the next related post. This looping continues until all related posts have been processed, at which point decision 785 branches to the 'no' branch.

The process determines as to whether there are more anaphors included in the selected post that need to be processed (decision 790). If there are more anaphors included in the selected post that need to be processed, then decision 790 branches to the 'yes' branch whereupon processing loops back to step 720 to select and process the next anaphor from the selected post. This looping continues until all anaphors in the selected post have been processed, at which point decision 790 branches to the 'no' branch.

The process determines as to whether there are more posts in the forum tree that need to be processed (decision 795). If there are more posts in the forum tree that need to be processed, then decision 795 branches to the 'yes' branch which loops back to select and process the next post from the forum tree. This looping continues until all of the posts have been processed, at which point decision 795 branches to the 'no' branch and processing returns to the calling routine (see FIG. 5) at 799.

FIG. 8 is an exemplary flowchart depicting steps performed by the process that ingests forum data with resolved anaphors to a question answering (QA) system. At predefined process 800, the process performs the Selectively Ingest Forum Posts with Resolved Anaphors into QA System Knowledge Base Based on Relevance to Parent Post and/or Main Post routine (see FIG. 14 and corresponding text for processing details). Predefined process 800 reads post data 410 from forum tree 400 and ingests the post data to knowledge base 106 that is utilized by question answering (QA) system 100. When requestor 810, such as a user of the QA system, poses a question to the QA system, the QA system may provide candidate answers that utilize the ingested forum data with such ingested data including resolved anaphors found in child post data.

FIG. 9 is an exemplary flowchart depicting steps that analyze the relevance of a post. FIG. 9 processing commences at 900 and shows the steps taken by a process that performs a routine that analyzes a post for relevance. At step 905, the process retrieves data from forum tree pertaining to a post, the post's parent(s) post(s), and the main post. The process determines as to whether the selected post is the main post (decision 910). If the selected post is the main post, then decision 910 branches to the 'yes' branch and processing returns to the calling routine (see FIG. 5) at 915. On the other hand, if the selected post is not the main post, then decision 910 branches to the 'no' branch and processing continues.

At step 920, the process compares and scores this child post's Lexical Answer Type (LAT) to its parent's LAT utilizing inter-thread anaphora data. Step 920 stores the Parent-LAT relationship score in memory area 925. At step 930, the process compares and score this child post's LAT to the LAT of the main post utilizing inter-thread anaphora data. Step 930 stores the Main-LAT relationship score in memory area 935.

At step 940, the process compares and score this child post's focus to its parent(s) focus utilizing inter-thread anaphora data. Step 940 stores the parent-focus relationship score in memory area 945. At step 950, the process compares and scores this child post's focus to the focus of the main post utilizing inter-thread anaphora data. Step 950 stores the main-focus relationship score in memory area 955.

At step 960, the process scores the sentiment of this child post to the content of parent post utilizing inter-thread anaphora data. Step 960 stores the parent sentiment score in memory area 965. At step 970, the process scores the sentiment of this child post to the content of the main post utilizing inter-thread anaphora data. Step 970 stores the main sentiment score in memory area 975. At step 980, the process stores the relevance scores (LAT & focus for the parent and main) and the sentiment scores related to post in post data 410. FIG. 9 processing thereafter returns to the calling routine (see FIG. 5) at 995.

Figure 10:
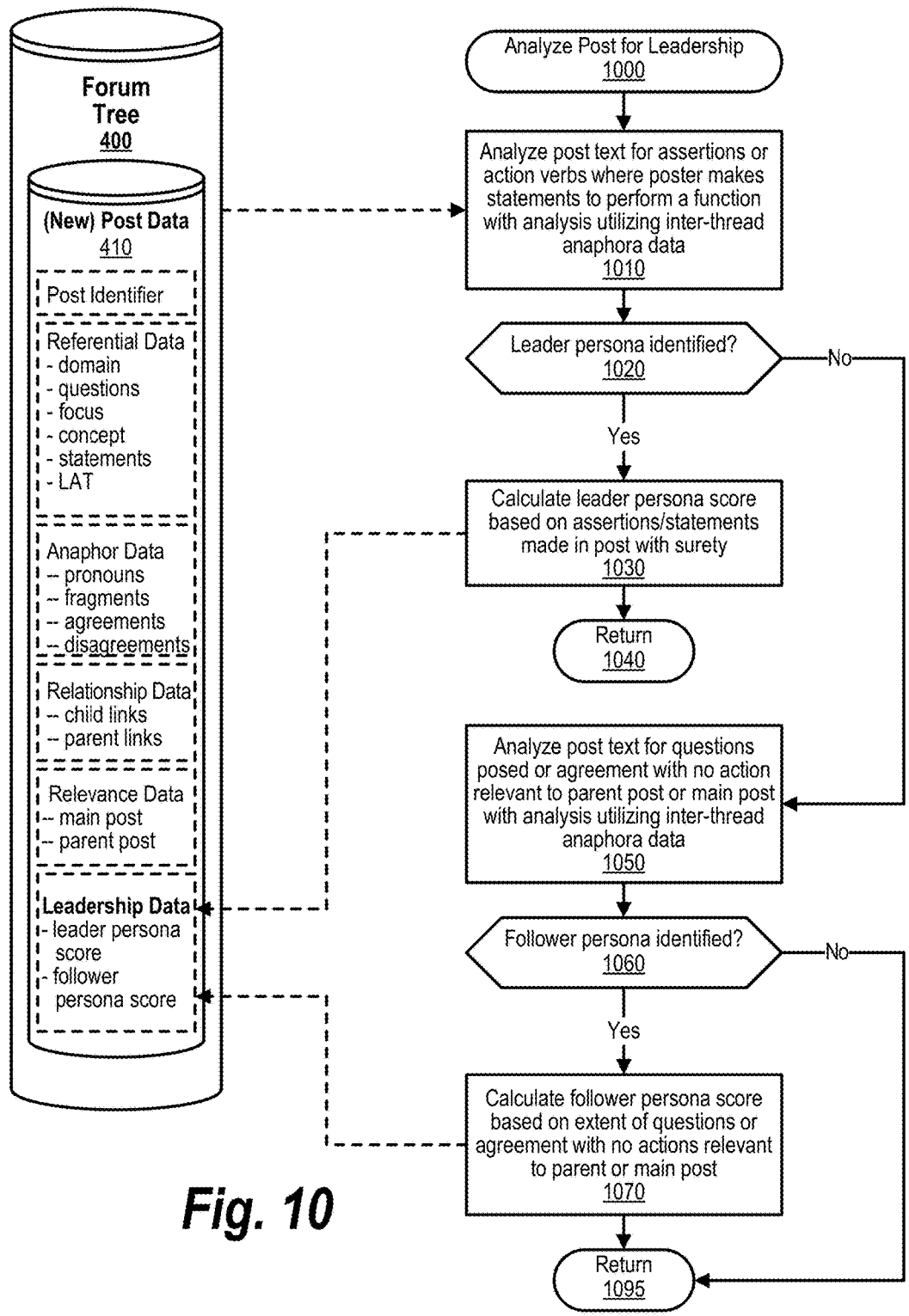
FIG. 10 is an exemplary flowchart depicting steps that analyze a post for leadership qualities.

FIG. 10 is an exemplary flowchart depicting steps that analyze a post for leadership qualities. FIG. 10 processing commences at 1000 and shows the steps taken by a process that performs a routine that analyzes a post for leadership or follower qualities. At step 1010, the process analyzes the selected post text from forum tree 400 for assertions or action verbs where the poster (writer of the post) makes statements to perform a function with the analysis of such leadership persona utilizing inter-thread anaphora data previously identified for the post.

The process determines as to whether leadership persona was identified in the post by step 1010 (decision 1020). If leadership persona was identified in the post, then decision 1020 branches to the 'yes' branch whereupon, at step 1030 the process calculates a leader persona score based on the assertions and/or statements made in post with surety. The leader persona score is stored as leadership data in the data pertaining to the post (data store 410). FIG. 10 processing thereafter returns to the calling routine (see FIG. 5) at 1040.

Figure 11:
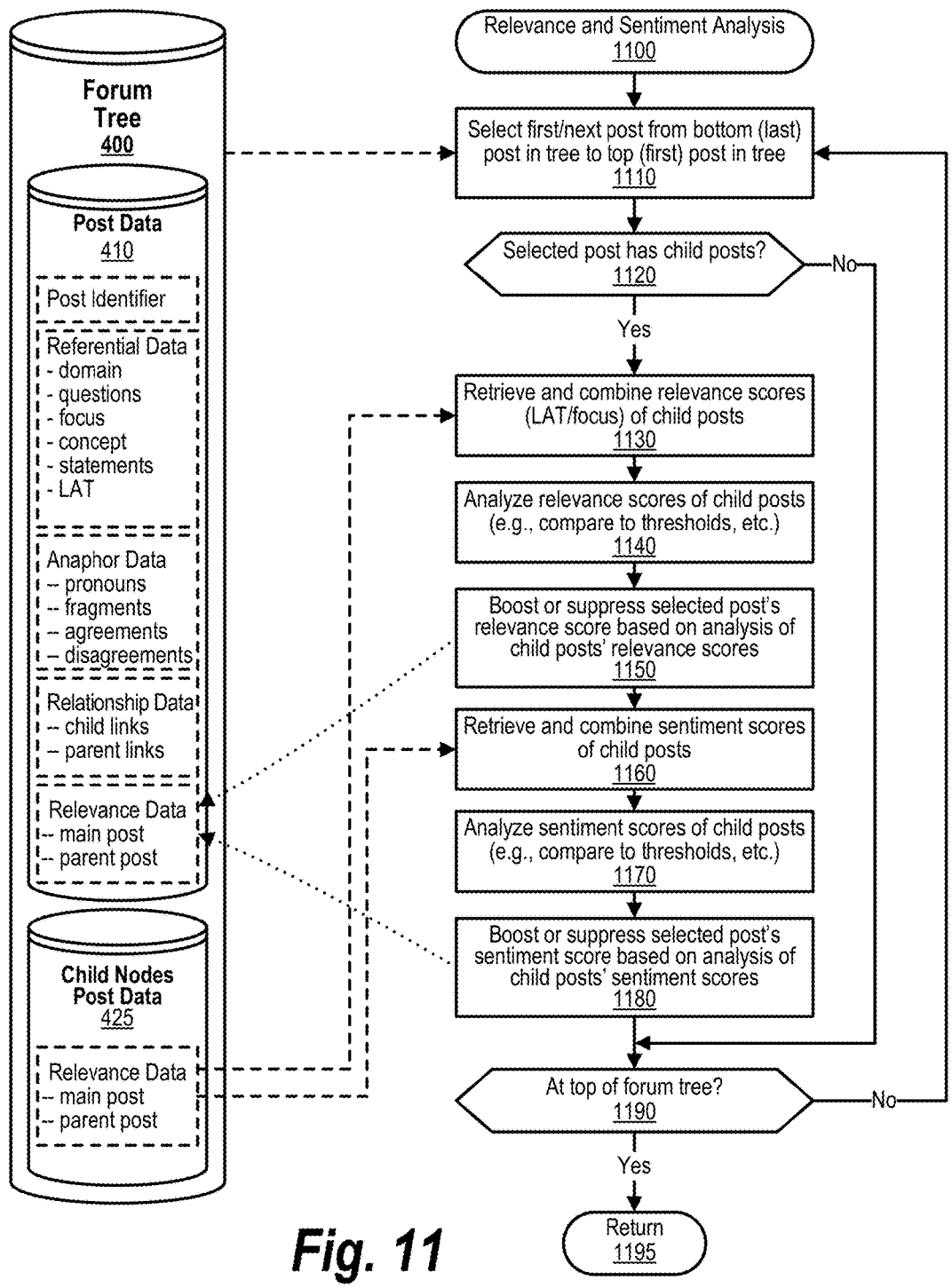
FIG. 11 is an exemplary flowchart depicting steps that perform relevance and sentiment analysis of posts in a forum.

On the other hand, if leadership persona was not identified in the post, then decision 1020 branches to the 'no' branch bypassing step 1030 and branching to steps that analyze the post for follower persona traits. At step 1050, the process analyzes the post text for questions posed by the poster or agreement made by the poster with little or no actions relevant to the post's parent post or to the main post. The analysis utilizes inter-thread anaphora data previously identified for the post. The process determines as to whether the analysis performed at step 1050 identified a follower persona in the post (decision 1160). If a follower persona is identified in the post, then decision 1160 branches to the 'yes' branch, whereupon at step 1070 the process calculates the follower persona score for the post based on the extent of questions or agreement in the post with little or no actions that are relevant to the post's parent post or to the main post. The follower persona score is stored as follower data in the leadership data pertaining to the post (data store 410). On the other hand, if a follower persona is not identified in the post, then decision 1160 branches to the 'no' branch bypassing step 1070. FIG. 11 processing thereafter returns to the calling routine (see FIG. 5) at 1195.

FIG. 11 is an exemplary flowchart depicting steps that perform relevance and sentiment analysis of posts in a forum. FIG. 11 processing commences at 1100 and shows the steps taken by a process that performs a relevance and sentiment analysis routine. At step 1110, the process selects the first post from bottom (last) post in tree as the forum tree is processed in reverse order from the bottom of the tree to the top (main post) of the tree. The process determines as to whether the selected post has child posts that reference the selected post (decision 1120). If the selected post has child posts that reference the selected post, then decision 1120 branches to the 'yes' branch to process the selected post using steps 1130 through 1180. On the other hand, if the selected post does not have any child posts that reference the selected post, then decision 1120 branches to the 'no' branch bypassing steps 1130 through 1180.

At step 1130, the process retrieves and combines the relevance scores (LAT/focus) of the child posts that refer to this selected (parent) post. At step 1140, the process analyzes the combined relevance scores of the child posts. For example, the relevance scores can be compared to thresholds that identify whether the post is somewhat more relevant than other posts. In one embodiment, the relevance scores are combined beforehand so that the tree's relevance scores can be used to obtain thresholds (e.g., above average relevance score, etc.). At step 1150, the process boosts or suppresses the selected post's relevance score based on analysis of the child posts' relevance scores that was performed in step 1140. For example, if the combined relevance scores are above average, then the selected post's relevance score might be boosted and if the combined relevance score is below average, then the selected post's relevance score might be reduced or otherwise suppressed. Additionally, posts with relevance scores in the top quartile or top ten percent might be further boosted and those posts with relevance scores in the bottom quartile or bottom ten percent might be further suppressed or reduced.

At step 1160, the process retrieves and combine the sentiment scores of the selected post's child posts. At step 1170, the process analyzes the combined sentiment scores of the selected post's child posts. For example, the sentiment scores can be compared to thresholds that identify whether the post is somewhat more relevant than other posts. In one embodiment, the sentiment scores are combined beforehand so that the tree's sentiment scores can be used to obtain thresholds (e.g., above average sentiment score, etc.). At step 1180, the process boosts or suppresses the selected post's sentiment score based on the analysis of the selected post's child posts' sentiment scores that was performed in step 1170. For example, if the combined sentiment scores are above average, then the selected post's sentiment score might be boosted and if the combined sentiment score is below average, then the selected post's sentiment score might be reduced or otherwise suppressed. Additionally, posts with sentiment scores in the top quartile or top ten percent might be further boosted and those posts with sentiment scores in the bottom quartile or bottom ten percent might be further suppressed or reduced.

The process determines as to whether the process has reached the top of forum tree with the last post selected having been the main post (decision 1190). If the process has not yet reached the top of forum tree, then decision 1190 branches to the 'no' branch which loops back to select and process the next post up the forum tree. This looping continues until all of the posts have been processed, at which point decision 1190 branches to the 'yes' branch and processing returns to the calling routine (see FIG. 5) at 1195.

Figure 12:
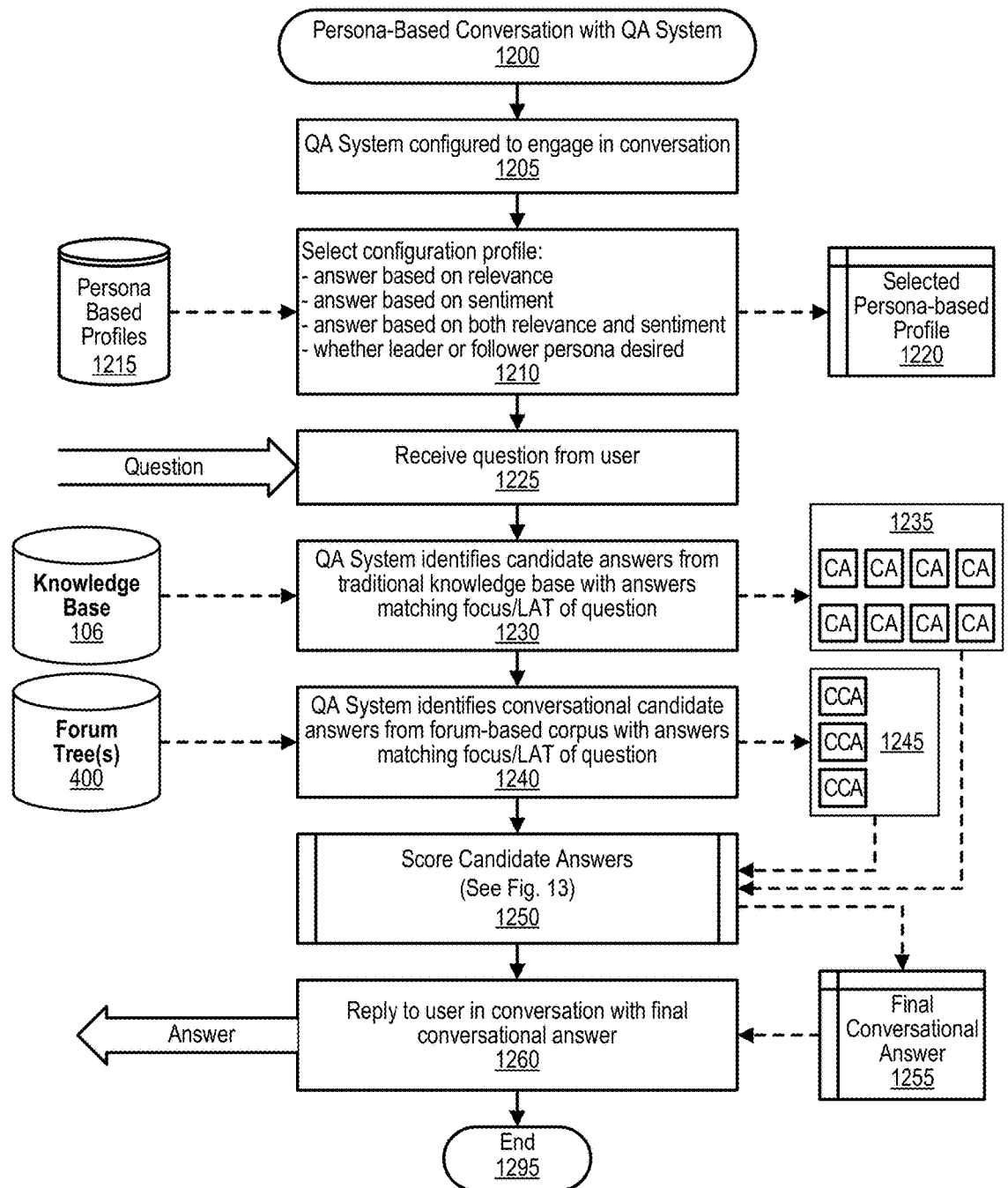
FIG. 12 is an exemplary flowchart depicting steps that build a persona-based conversation between a question answering (QA) system and a user of the system.

FIG. 12 is an exemplary flowchart depicting steps that build a persona-based conversation between a question answering (QA) system and a user of the system. FIG. 12 processing commences at 1200 and shows the steps taken by a process that performs a persona-based conversation routine that allows a user to have a natural language conversation with a question answering (QA) system.

At step 1205, the process configures the QA System to engage in conversation with a user. At step 1210, the process selects a configuration profile from a set of available profiles. The profiles include a preference to weigh candidate answers based on relevance, to weigh candidate answers based on sentiment, to weigh candidate answers based on both relevance and sentiment, and whether a leader or follower persona desired in the candidate answer. Step 1210 retrieves persona based profiles from data store 1215 and stores the selected persona-based profile in memory area 1220.

At step 1225, the process receives a question from a user. In one embodiment, the user is the entity that selected the persona-based profile by interacting with the QA system so that the selected persona-based profile was selected in step 1210. At step 1230, the process employed by the QA system identifies candidate answers from traditional knowledge base 106 with answers matching the focus and Lexical Answer Type (LAT) of the question that was posed by the user. The candidate answers are stored as potential candidate answers in memory area 1235. At step 1240, the process employed by the QA System identifies a set of conversational candidate answers from a forum-based corpus (forum trees 400) with these candidate answers also matching the focus and the LAT of the question posed by the user. These conversational candidate answers are stored in memory area 1245.

Figure 13:
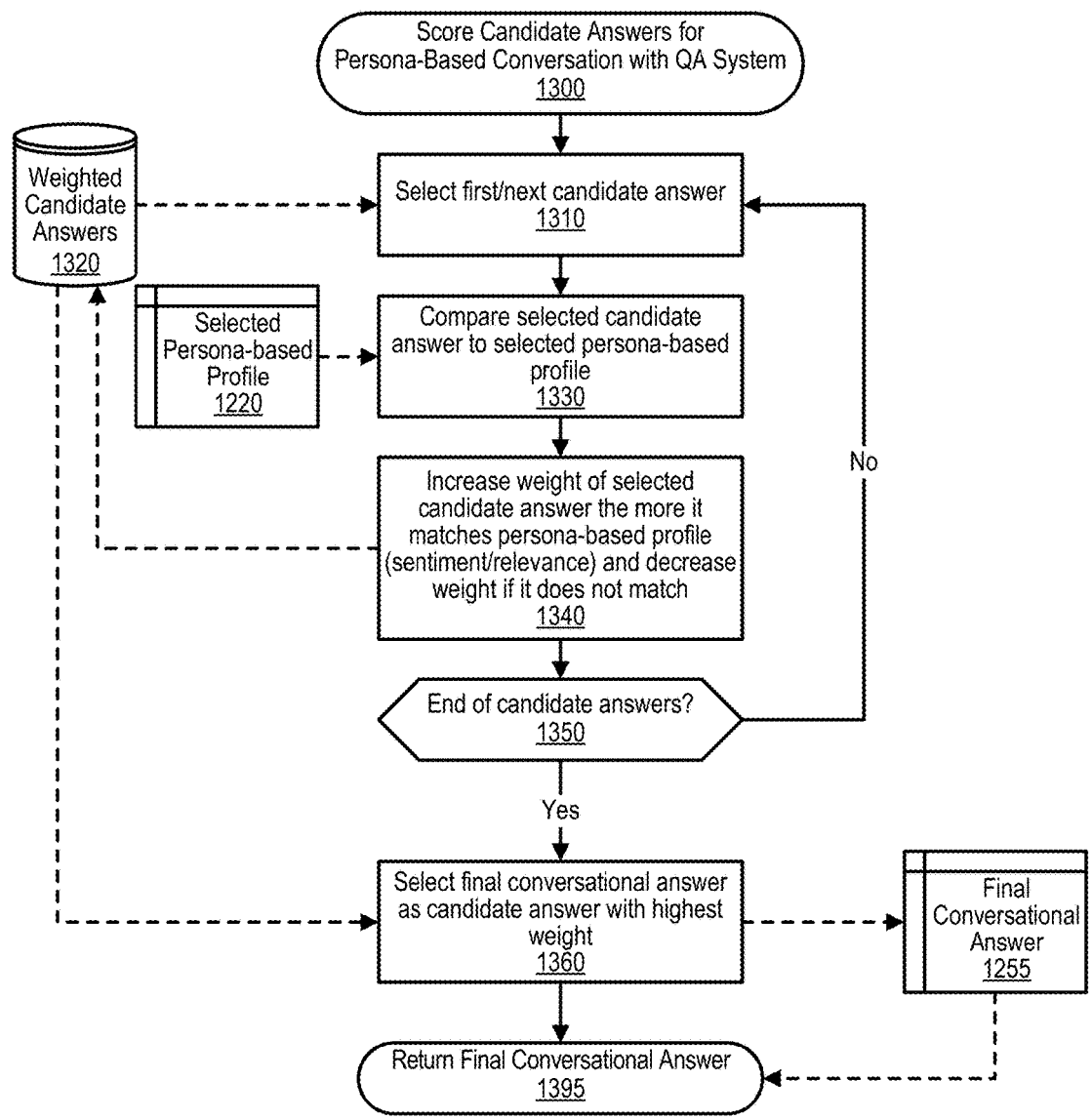
FIG. 13 is an exemplary flowchart depicting steps that score candidate answers for a persona-conversation between a question answering (QA) system and a user of the system.

At predefined process 1250, the process performs the Score Candidate Answers routine (see FIG. 13 and corresponding text for processing details). Predefined process 1250 takes the traditional candidate answers from memory area 1235 and the conversational candidate answers from memory area 1245 to result in one or more final conversational answers that are stored in memory area 1255. At step 1260, the process replies to the user in with the final conversational answer(s) that were stored in memory area 1255. In one embodiment, a conversational tone is used in the reply so that the answer has a conversational feel not unlike the tone used in the user's original question posed to the user in step 1225. FIG. 12 processing thereafter ends at 1295.

In one embodiment, when ingesting corpora that is in the forum or thread form, the main topic is treated as the main context. We identify the series of focus and LAT for the main topic. A focus and LAT are deduced, but maintain the most confident focus and LAT. The Inter-Thread Anaphora Resolution data is utilized to diagnose associations across focuses in the responses to then in combination determine a relevance score for each child response. The child responses are analyzed for similarity based on the focus, LAT and word vocabulary. The sentiment levels for each individual post in relation to the main terms are recorded with each conversation. The positive, neutral, or negative phrase in the statement is determined and a sentiment level is associated with that part of the statement. In addition, the embodiment utilizes prismatic frames with a sentiment level attached to identify categorize those phrases as positive or negative in their relation to the main topic or parent topic.

Example Parsing with SVO and Sentiment

Overall question (main post): "How is the weather?"

Response post: "The weather is beautiful. It's seventy degrees and clear. A sunny day like today is great for surfing. I'm the best surfer ever, just ask my awesome friends!"

S1: The weather is beautiful. Subject="weather", overall relevance=80%. "beautiful"=subject complement adjective, sentiment=70%

S2: "It's seventy degrees and clear." Anaphora resolution resolves "It's" as the subject="weather", overall relevance=100%. as "seventy degrees" and "clear" are highly correlated to the weather type. sentiment=neutral.

S3: "A sunny day like today is great for surfing." Subject="sunny day", an ontology tells us this is type=weather, so overall relevance=80%. Subject complements "sunny" and "great" lead to sentiment=90%

S4a: "I'm the best surfer ever." Subject=I, I is type=person, no relevance to question, this subject-verb-object (SVO) is not considered.

S4b: "Just ask my awesome friends!" In this command structure, the implied subject is "you", type=person, no relevance to this question, this SVO is not considered.

Thus, only the first three sentences are considered in scoring the response (S1, S2, and S3). This response will be scored with high relevance and medium-high sentiment.

Note that a generic sentiment scoring algorithm would have given this response a very high sentiment, as the fourth sentence was overwhelmingly high sentiment. However, the high sentiment was not related to the topic at hand, so our algorithm disregards it.

Below is a second example forum thread ingestion. A forum thread appears as follows. (Responses are marked with Rn, nested responses with RnRm.). Inter-Thread Anaphor Resolution (ITAR) is used to resolve anaphors.

TOPIC: "What's the weather like where you are?" (LAT=WeatherConditions)

R1: "It's sunny and 70 degrees with a slight breeze" (ITAR to "The weather is sunny and 70 degrees with a slight breeze", Persona="Leader"), (relevant=100% from three weather terms of sunny/70 degrees/slight breeze, sentiment=5)

* R2: "It's a beautiful 70 degrees and I'm going to the beach!" (ITAR to "The weather is a beautiful 70 degrees and I'm going to the beach!" Persona="Leader") (relevant=90% from two weather terms of beautiful/70 degrees, overall sentiment=8, beautiful 70 degrees sentiment=9, I'm going to the beach sentiment=7)

** R2R1"Here too! I can't wait to get some surfing in!" (ITAR to 'The weather is beautiful here too and I'm going to the beach! I'm going to the beach!') (ITAR Here also, I cannot wait to get some surfing in! "Persona="Leader") (relevant=20%, sentiment=9) (relevant="20%, sentiment=5)

*** R2R1R1"I love surfing!" (relevance to Topic=0%, sentiment=7, relevance to Parent=90%, Persona="Follower")

* R3: "Who cares, I never go outside" (relevant=10%, sentiment=1, Persona="Leader")

* R4: "I love it!!!" (relevant=10%, sentiment=10)

FIG. 13 is an exemplary flowchart depicting steps that score candidate answers for a persona-conversation between a question answering (QA) system and a user of the system. FIG. 13 processing commences at 1300 and shows the steps taken by a process that performs a routine that scores candidate answers for a persona-based conversation with a question answering (QA) system. At step 1310, the process selects the first candidate answer from a set of weighted candidate answers stored in data store 1320. Weighted candidate answers 1320 include both the candidate answers stored in memory area 1235 in FIG. 12 as well as the conversational candidate answers stored in memory area 1245 in FIG. 12.

At step 1330, the process compares the selected candidate answer to the selected persona-based profile that was previously stored in memory area 1220. At step 1340, the process increases the weight of the selected candidate answer the more it matches the selected persona-based profile (sentiment/relevance) and decreases the weight the more it does not match the selected persona-based profile. The process determines as to whether the end of the set of candidate answers has been reached (decision 1350). If the end of the set of candidate answers has not yet been reached, then decision 1350 branches to the 'no' branch which loops back to step 1310 to select and process the next candidate answer from data store 1320. This looping continues until all of the candidate answers have been processed, at which point decision 1350 branches to the 'yes' branch for further processing. At step 1360, the process selects the final conversational answer, or answers, as the candidate answer (s) with the highest weight after taking into account the persona-based profile that has been selected. The final conversational candidate answer(s) are stored in memory area 1255. FIG. 13 processing thereafter returns to the calling routine (see FIG. 12) at 1395.

Figure 14:
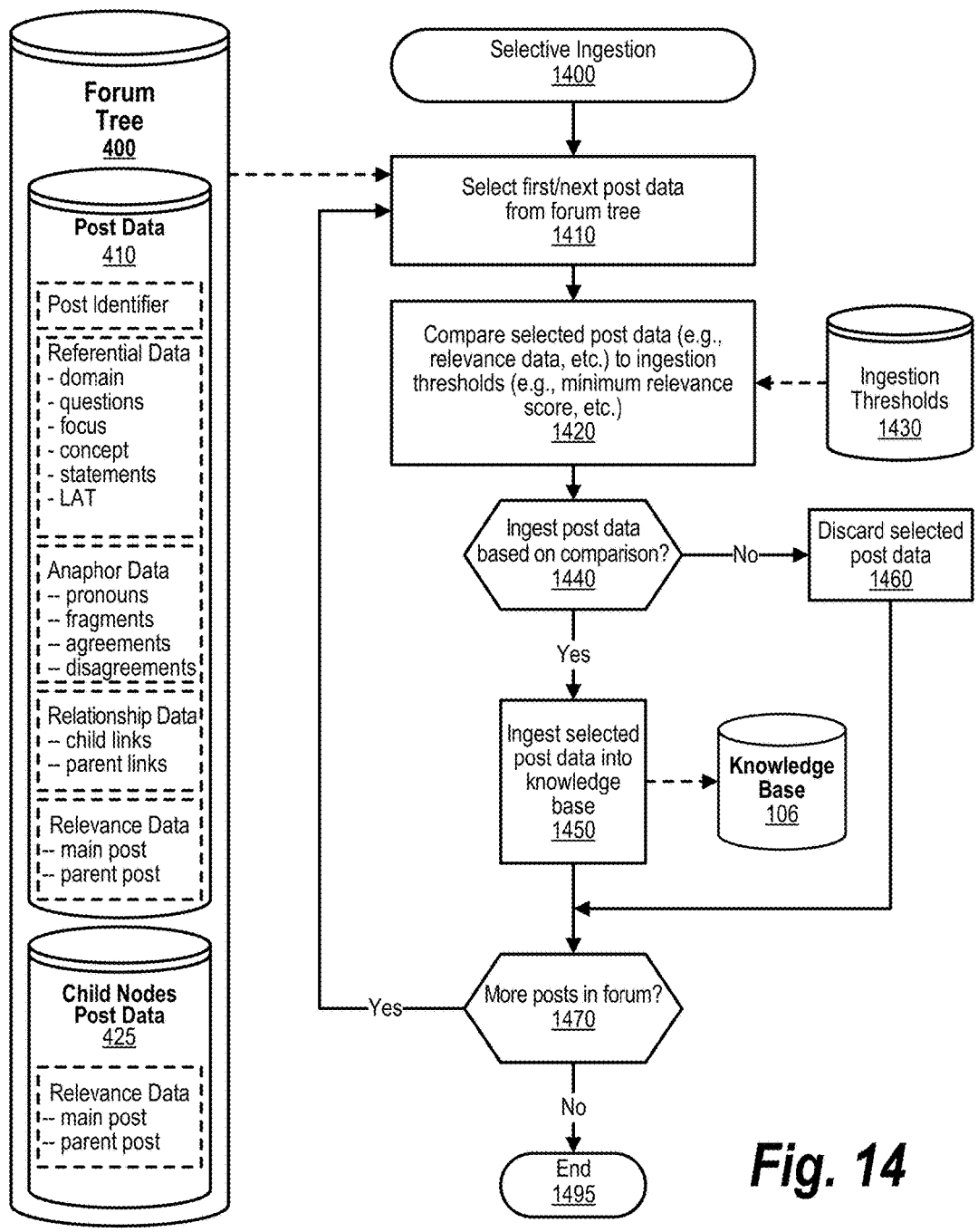
FIG. 14 is an exemplary flowchart depicting steps that selectively ingest post data from a forum into a corpus utilized by a question answering (QA) system.

FIG. 14 is an exemplary flowchart depicting steps that selectively ingest post data from a forum into a corpus utilized by a question answering (QA) system. FIG. 14 processing commences at 1400 and shows the steps taken by a process that performs a routine that selectively ingests post data to a knowledge base utilized by a question answering (QA) system. At step 1410, the process selects the first set of post data from forum tree 400.

At step 1420, the process compares the selected post data (e.g., relevance data, sentiment data, etc.) to ingestion thresholds (e.g., minimum relevance score, minimum sentiment score, etc.). The ingestion thresholds are retrieved from data store 1430. The process determines as to whether to ingest the selected post data based on comparison performed in step 1420 (decision 1440). If the determination is to ingest the selected post data based on comparison, then decision 1440 branches to the 'yes' branch whereupon, at step 1450, the process ingests the selected post data into knowledge base 106. The post data includes the text of the post, the referential data of the post (the domain of the post, questions posed in the post, the focus of the post, the concept of the post, statements made in the post, and the Lexical Answer Type (LAT) of the post). The post data also includes resolved anaphor data such as resolved pronoun type anaphors, resolved fragment type anaphors, and resolved agreement or disagreement type anaphors. The post data further includes child and parent links to the selected post, and relevance data such as relevance and sentiment scores of the post. In one embodiment, the post data also includes leadership data found for the post, relevance data found for the post, and sentiment data found for the post.

On the other hand, if the determination is to avoid ingestion of the selected post data based on the comparison performed in step 1420, then decision 1440 branches to the 'no' branch. At step 1460, the process discards the selected post data in inhibits ingestion of the post data into knowledge base 106.

The process determines as to whether there are more posts in the forum or thread that need to be processed (decision 1470). If there are more posts in the forum or thread that need to be processed, then decision 1470 branches to the 'yes' branch which loops back to select and process the next post from post data 410 as described above. This looping continues until all of the posts from post data 410 have been processed, at which point decision 1470 branches to the 'no' branch and the selective ingestion process ends at 1495.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
one or more processors;
one or more data stores accessible by at least one of the processors;
a memory coupled to at least one of the processors; and
a set of computer program instructions stored in the memory and executed by at least one of the processors in order to perform actions of:
analyzing a plurality of posts included in one or more threads of an online forum, wherein the analyzing further comprises:
identifying a main topic related to a parent post of the thread;
selecting a plurality child posts of the thread, wherein the parent post is a parent to each of the child posts;
identifying any referential types corresponding to a plurality of words included in the parent post;
identifying any anaphora types corresponding to a plurality of words included in each of the child posts;
associating each of the plurality of child posts with the parent post as a relationship;
resolving the anaphora types included in the child posts with at least one of the referential types included in the parent post;
determining a sentiment between each of the child posts and the parent post, wherein the determining further comprises establishing a sentiment score of each of the child posts based on an identified sentiment of each of the child posts to the parent post;
identifying a plurality of child topics, wherein each of the plurality of child topics corresponds to one of the child posts; and
determining a relevance of each of the child posts by comparing the identified main topic to each of the identified child topics;
selecting one or more of the child posts based on the relevance of the child posts and the determined sentiment;
ingesting data from the parent post into a corpus utilized by a question answering (QA) system;
ingesting data from the one or more selected child posts into the corpus; and
building a forum tree corresponding to the online forum, wherein the forum tree includes the parent post and the selected one or more child posts, the relationships between the parent post and each of the selected child posts, and the resolved anaphora types included in each of the selected child posts.

2. The information handling system of claim 1 wherein the actions further comprise:
identifying referential data in the child posts and the parent post, wherein at least one of the referential data is selected from the group consisting of domain, question, focus, concept, statements, and a lexical answer type (LAT); and
storing the referential data in the corpus utilized by the QA system.

3. The information handling system of claim 1 wherein the actions further comprise:
identifying the sentiment of each of the child posts by utilizing the resolved anaphors between the child posts and the parent post.

4. The information handling system of claim 1 wherein the main topic and the child topics are selected from a group consisting of a Lexical Answer Type (LAT) and a focus.

5. A computer program product stored in a computer readable storage medium, comprising computer program code that, when executed by an information handling system, causes the information handling system to perform actions comprising:
analyzing a plurality of posts included in one or more threads of an online forum, wherein the analyzing further comprises:
identifying a main topic related to a parent post of the thread;
selecting a plurality child posts of the thread, wherein the parent post is a parent to each of the child posts;
identifying any referential types corresponding to a plurality of words included in the parent post;
identifying any anaphora types corresponding to a plurality of words included in each of the child posts;

associating each of the plurality of child posts with the parent post as a relationship;

resolving the anaphora types included in the child posts with at least one of the referential types included in the parent post;

determining a sentiment between each of the child posts and the parent post, wherein the determining further comprises establishing a sentiment score of each of the child posts based on an identified sentiment of each of the child posts to the parent post;

identifying a plurality of child topics, wherein each of the plurality of child topics corresponds to one of the child posts and the determined sentiment; and determining a relevance of each of the child posts by comparing the identified main topic to each of the identified child topics;

selecting one or more of the child posts based on the relevance of the child posts;

ingesting data from the parent post into a corpus utilized by a question answering (QA) system;

ingesting data from the one or more selected child posts into the corpus; and building a forum tree corresponding to the online forum, wherein the forum tree includes the parent post and the selected one or more child posts, the relationships between the parent post and each of the selected child posts, and the resolved anaphora types included in each of the selected child posts.

6. The computer program product of claim 5 wherein the actions further comprise:

identifying referential data in the child posts and the parent post, wherein at least one of the referential data is selected from the group consisting of domain, question, focus, concept, statements, and a lexical answer type (LAT); and storing the referential data in the corpus utilized by the QA system.

7. The computer program product of claim 5 wherein the actions further comprise:

identifying the sentiment of each of the child posts by utilizing the resolved anaphors between the child posts and the parent post.

\* \* \* \* \*